J. G. HEIDT.
ICE TONGS.
APPLICATION FILED OCT. 28, 1920.
1,401,777. Patented Dec. 27, 1921.
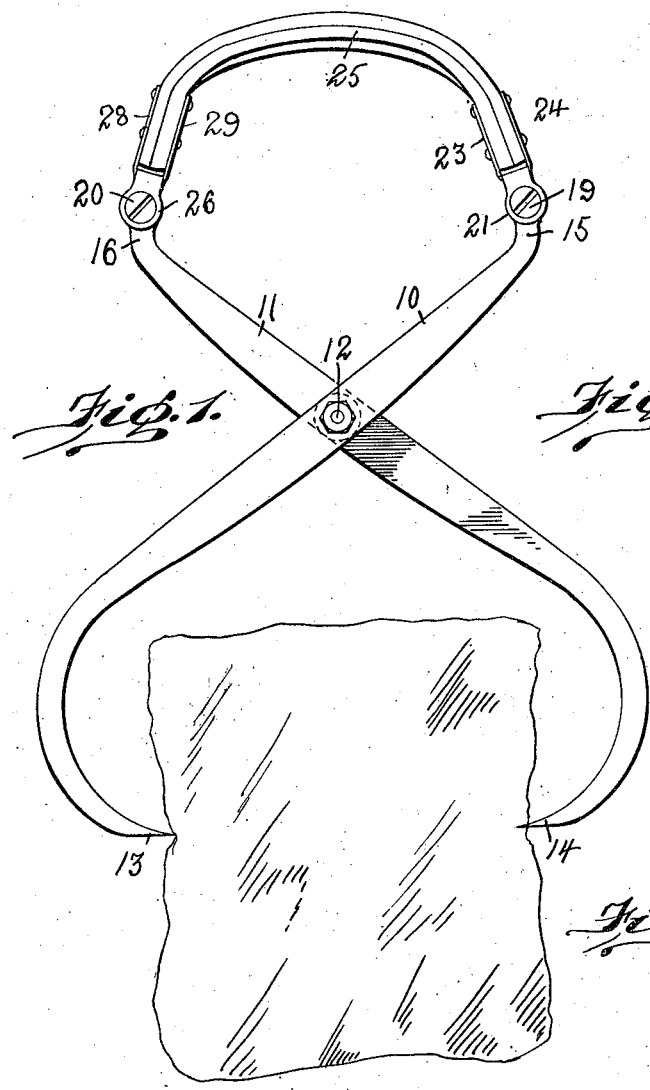
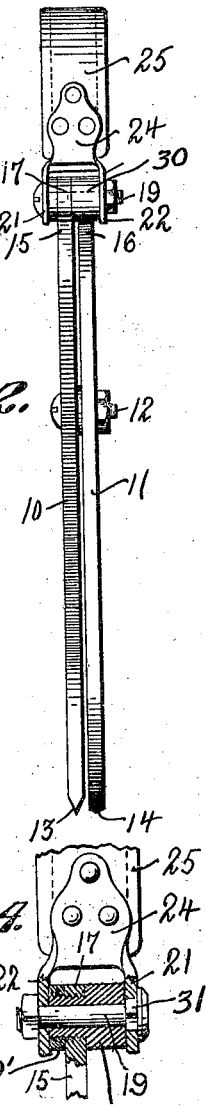
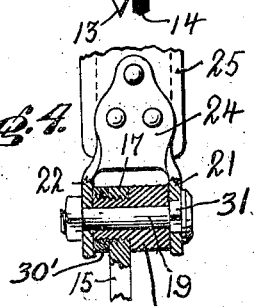
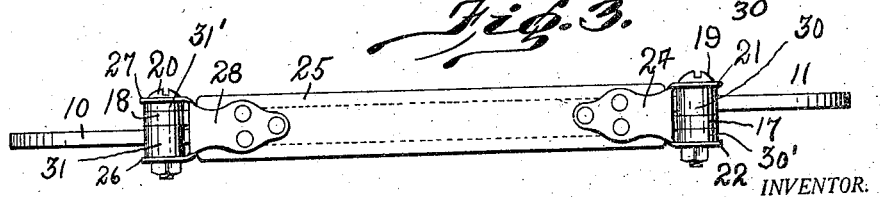

UNITED STATES PATENT OFFICE.

JACOB G. HEIDT, OF EVANSVILLE, INDIANA.

ICE-TONGS.

1,401,777. Specification of Letters Patent. Patented Dec. 27, 1921.

Application filed October 28, 1920. Serial No. 420,213.

*To all whom it may concern:*

Be it known that I, JACOB G. HEIDT, a citizen of the United States, residing at Evansville, in the county of Vanderburg and State of Indiana, have invented certain new and useful Improvements in Ice-Tongs, of which the following is a specification.

This invention relates to improvements in ice tongs, and has for one of its objects to improve the construction and increase the efficiency and utility of devices of this character.

Another object of the invention is to provide a device of this character which may be folded into reduced space when not in use, or when being transported.

With these and other objects in view, the invention consists in certain novel features of construction as hereinafter shown and described and then specifically pointed out in the claim, and in the drawings illustrative of the preferred embodiment of the invention.

Figure 1 is a front elevation.

Fig. 2 is a side elevation, showing the device in open or operative position.

Fig. 3 is a plan view showing the implement in folded position.

Fig. 4 is an enlarged sectional detail illustrating the construction of joints between the flexible handle and the ice engaging stock members.

The improved implement comprises co-acting stock members 10—11 pivotally united at 12 intermediate the ends.

The member 10 is formed at one end with a laterally directed ice engaging point or hook 13, while the member 11 is formed with a similar ice engaging point or hook 14. At their other ends the members 10—11 are out-turned as shown at 15—16 to form offset eyes 17—18 to receive pivot pins 19—20.

Engaging the pin 19 is a clip device including spaced apertured ears 21—22 swinging on the pin, and integral clamp plates 23—24 bearing upon the opposite faces of a flexible handle element 25 at one end, the plates being riveted or otherwise rigidly attached to the handle member, as shown.

The pin 19 is formed with a squared portion 31 which fits in a correspondingly shaped aperture in the ear 21, whereby the pin is held from turning in the ear 21 as disclosed in Fig. 4.

Engaging the pin 20 is a clip device including spaced apertured ears 26—27 swinging on the pin, and integral clamp plates 28—29 bearing upon the opposite faces of the flexible handle element 25 at the opposite end, the plates being riveted or otherwise rigidly attached to the handle member, as shown.

Rotative on the pivot pin 19 between the ears 21—22 is a sleeve 30 having a reduced threaded portion, as shown in Fig. 4.

The eye 17 of the offset portion 15 of the stock member 10 is internally threaded to engage the threaded portion of the sleeve 30. Engaging the same threaded sleeve portion is a washer 30' operating to bind the eye 17 in position, and clamp it to the body of the sleeve.

At its opposite end the flexible handle member is coupled to the eye 18 of the stock member 11 by a duplicate arrangement of sleeve and washer devices, the latter sleeve being designated by the character 31 and the washer by the character 31', as shown in Fig. 3.

By this means the joints between handle member and the stock members are increased in strength, and the wearing of the parts reduced without material increase of expense or weight.

The offsets 15—16 hold the eye terminals of the members 10—11 in such a position that when they are folded as shown in Fig. 3, the portions of the members 10—11 between the pivot 12 and offsets 15—16 are in longitudinal alinement and the flexible handle member lies close to the members 10—11 for its whole length. Thus when folded the improved tong device occupies comparatively little space.

The preferred embodiment of the invention is disclosed in the drawings and set forth in the specification, but it will be understood that any modifications within the scope of the claim may be made in the construction without departing from the principle of the invention or sacrificing any of its advantages.

I claim:

In a device of the class described, a clip device including spaced perforated ears, a bolt extending through the perforations of said ears and held from turning therein, a sleeve rotative on said bolt between said ears with a reduced and externally threaded portion, a member mounted on said reduced sleeve portion, and a clamping washer engaging said reduced sleeve portion between one of said clip ears and the rotative member.

In testimony whereof, I affix my signature hereto.

JACOB G. HEIDT.